US011554315B2

(12) United States Patent
Reddan et al.

(10) Patent No.: US 11,554,315 B2
(45) Date of Patent: Jan. 17, 2023

(54) COMMUNICATION WITH AUGMENTED REALITY VIRTUAL AGENTS

(71) Applicant: SQUARE ENIX LTD., London (GB)

(72) Inventors: Anthony Reddan, Montréal (CA); Renaud Bédard, Montréal (CA)

(73) Assignee: SQUARE ENIX LTD., London (GB)

(*) Notice: Subject to any disclaimer, the term of this patent is extended or adjusted under 35 U.S.C. 154(b) by 454 days.

(21) Appl. No.: 16/552,947

(22) Filed: Aug. 27, 2019

(65) Prior Publication Data

US 2020/0376369 A1 Dec. 3, 2020

(30) Foreign Application Priority Data

Jun. 3, 2019 (CA) .................. CA 3045132

(51) Int. Cl.
*A63F 13/21* (2014.01)
*G06T 19/00* (2011.01)
*G06F 3/16* (2006.01)
*G10L 15/18* (2013.01)
*G10L 15/26* (2006.01)
*G06V 20/20* (2022.01)

(52) U.S. Cl.
CPC ............. *A63F 13/21* (2014.09); *G06F 3/167* (2013.01); *G06T 19/006* (2013.01); *G06V 20/20* (2022.01); *G10L 15/1815* (2013.01); *G10L 15/26* (2013.01)

(58) Field of Classification Search
CPC . A63F 13/00; A63F 13/21; G06F 3/00; G06F 3/167; G06K 9/00; G06K 9/00671; G06T 19/00; G06T 19/006; G10L 15/00; G10L 15/26; G10L 15/1815
See application file for complete search history.

(56) References Cited

U.S. PATENT DOCUMENTS

2006/0167675 A1* 7/2006 Miyahira ................ G06F 40/55
704/2
2014/0310595 A1* 10/2014 Acharya ............. G06F 3/04842
715/706
(Continued)

OTHER PUBLICATIONS

A. Schmeil and W. Broll, "MARA—A Mobile Augmented Reality-Based Virtual Assistant," 2007 IEEE Virtual Reality Conference, 2007, pp. 267-270, doi: 10.1109/VR.2007.352497 (Year: 2007).*
(Continued)

*Primary Examiner* — Daniel C Washburn
*Assistant Examiner* — Sean E Serraguard
(74) *Attorney, Agent, or Firm* — Fenwick & West LLP

(57) ABSTRACT

A method implemented by a processor of a computing device, comprising: receiving an image from a camera; using a machine vision process to recognize the at least one real-world object in the image; displaying on a screen an augmented reality (AR) scene containing the at least one real-world object and a virtual agent; receiving user input; deriving a simplified user intent from the user input; and in response to the user input, animating the virtual agent within the AR scene, the animating being dependent on the simplified user intent. Deriving a simplified user intent from the user input may include converting the user input into a user phrase, determining at least one semantic element in the user phrase, and converting the at least one semantic element into the simplified user intent.

26 Claims, 14 Drawing Sheets

(56) References Cited

U.S. PATENT DOCUMENTS

| | | | | |
|---|---|---|---|---|
| 2014/0333666 | A1* | 11/2014 | Poulos | G02B 27/017 |
| | | | | 345/633 |
| 2015/0286698 | A1* | 10/2015 | Gagnier | G06F 3/04842 |
| | | | | 707/736 |
| 2017/0169616 | A1* | 6/2017 | Wiley | G06F 3/04815 |
| 2017/0206095 | A1* | 7/2017 | Gibbs | G06F 9/453 |
| 2019/0018694 | A1* | 1/2019 | Rhodes | G10L 15/18 |
| 2019/0332400 | A1* | 10/2019 | Spoor | G06F 9/453 |
| 2019/0385595 | A1* | 12/2019 | Wabgaonkar | G06F 40/35 |
| 2020/0160042 | A1* | 5/2020 | Bui | G06N 3/0454 |
| 2020/0301959 | A1* | 9/2020 | Anorga | G06F 16/54 |
| 2020/0394012 | A1* | 12/2020 | Wright, Jr. | G02B 27/0101 |

OTHER PUBLICATIONS

I. Wang, J. Smith, and J. Ruiz. "Exploring Virtual Agents for Augmented Reality." In Proceedings of the 2019 CHI Conference on Human Factors in Computing Systems(CHI '19). ACM, New York, NY, USA, 281:1-281:12. https://doi.org/10.1145/3290605.3300511 Published: May 2, 2019. (Year: 2019).*

* cited by examiner

| User Phrase | Semantic Elements |
|---|---|
| | |
| Please go get the ball | [go get][ball] |
| I want you to attack the gremlin | [attack][gremlin] |
| Can you fetch the book please? | [fetch][book] |
| Hi! | [hi] |
| Hi! Please play the piano! | [hi][play][piano] |

FIG. 9A

| Semantic Elements | Simplified User Intent |
|---|---|
| | |
| [go get][ball] | [retrieve command][object X] |
| [attack][gremlin] | [attack command][object Y] |
| [fetch][book] | [retrieve command][object Z3][object Z4] |
| [hi] | [greeting] |
| [hi][play][piano] | [interact command][object D] |

FIG. 9B

|       | User Phrase                      | Semantic Elements    | Simplified User Intent              |
|-------|----------------------------------|----------------------|-------------------------------------|
| 910A  | Please go get the ball           | [go get][ball]       | [retrieve command][object X]        |
| 910B  | I want you to attack the gremlin | [attack][gremlin]    | [attack command][object Y]          |
| 910C  | Can you fetch the book please?   | [fetch][book]        | [retrieve command][object Z3][object Z4] |
| 910D  | Hi!                              | [hi]                 | [greeting]                          |
| 910E  | Hi! Please play the piano!       | [hi][play][piano]    | [interact command][object D]        |

FIG. 9C

COMMUNICATION WITH AUGMENTED REALITY VIRTUAL AGENTS

CROSS-REFERENCE TO RELATED APPLICATION

This application claims priority to Canadian Patent Application No. 3,045,132 filed on Jun. 3, 2019, which is incorporated by reference herein in its entirety.

FIELD

The present application relates in general to computer games and, in particular, to interactive computer games that use augmented reality.

BACKGROUND

Augmented reality has transformed the world of computer games, allowing the mixing of real-world images with depictions of virtual objects. However, while such games may allow the detection of surfaces (AR planes) from real-world images, they remain limited insofar as the user's ability to communicate with virtual agents is concerned. This leads to games that are less exciting to play and less likely to be purchased by consumers.

SUMMARY

The present disclosure relates to, among other things, a virtual agent communication process implemented by a gaming device that allows a user of the gaming device to communicate with, and thereby seemingly control through natural language, a virtual agent appearing on the screen of the gaming device within an augmented-reality 3D scene. The virtual agent then "interacts" with various real-world and virtual objects whose properties and positions are stored in the device memory. It is believed that more advanced communication features with respect to virtual agents such as those provided herein could allow game publishers to attract and retain greater volumes of customers.

Accordingly, there is provided a method implemented by a processor of a computing device, comprising: receiving an image from a camera; using a machine vision process to recognize the at least one real-world object in the image; displaying on a screen an augmented reality (AR) scene containing at least one real-world object and a virtual agent; receiving user input; deriving a simplified user intent from the user input; and in response to the user input, causing the virtual agent to exhibit a reaction within the AR scene, the reaction being dependent on the simplified user intent.

According to a second broad aspect, there is provided a computer-readable storage medium comprising computer-readable instructions which, when read and executed by at least one processor of a gaming device, cause the gaming device to carry out a method in a video game that comprises: receiving an image from a camera; using a machine vision process to recognize at least one real-world object in the image; displaying on a screen an augmented reality (AR) scene containing the at least one real-world object and a virtual agent; receiving user input; deriving a simplified user intent from the user input; and in response to the user input, causing the virtual agent to react within the AR scene, the reaction being dependent on the simplified user intent.

According to a third broad aspect, there is provided a gaming device comprising at least one processor and a memory storing instructions for execution by the processor, at least one input device configured to receive input from a user, at least one output device configured for providing output to the user, the at least one processor configured to execute the instructions in the memory for implementing an interactive computer program that generates the output in response to the received input and, the interactive computer program including at least one process that comprises: receiving an image from a camera; using a machine vision process to recognize at least one real-world object in the image; displaying on a screen an augmented reality (AR) scene containing the at least one real-world object and a virtual agent; receiving user input; deriving a simplified user intent from the user input; and in response to the user input, reacting the virtual agent within the AR scene, the reacting being dependent on the simplified user intent.

BRIEF DESCRIPTION OF THE DRAWINGS

These and other aspects and features of various embodiments will become apparent from the following description with reference to the accompanying drawings, in which:

FIG. 9A shows a correspondence between user phrases and semantic elements.

FIG. 9B shows a correspondence between semantic elements and simplified user intents.

FIG. 9C is a combination of FIGS. 9A and 9B.

The aforementioned drawings are provided as non-limiting examples and illustrations of various aspects and features described in the following description.

DETAILED DESCRIPTION

Figure 1:
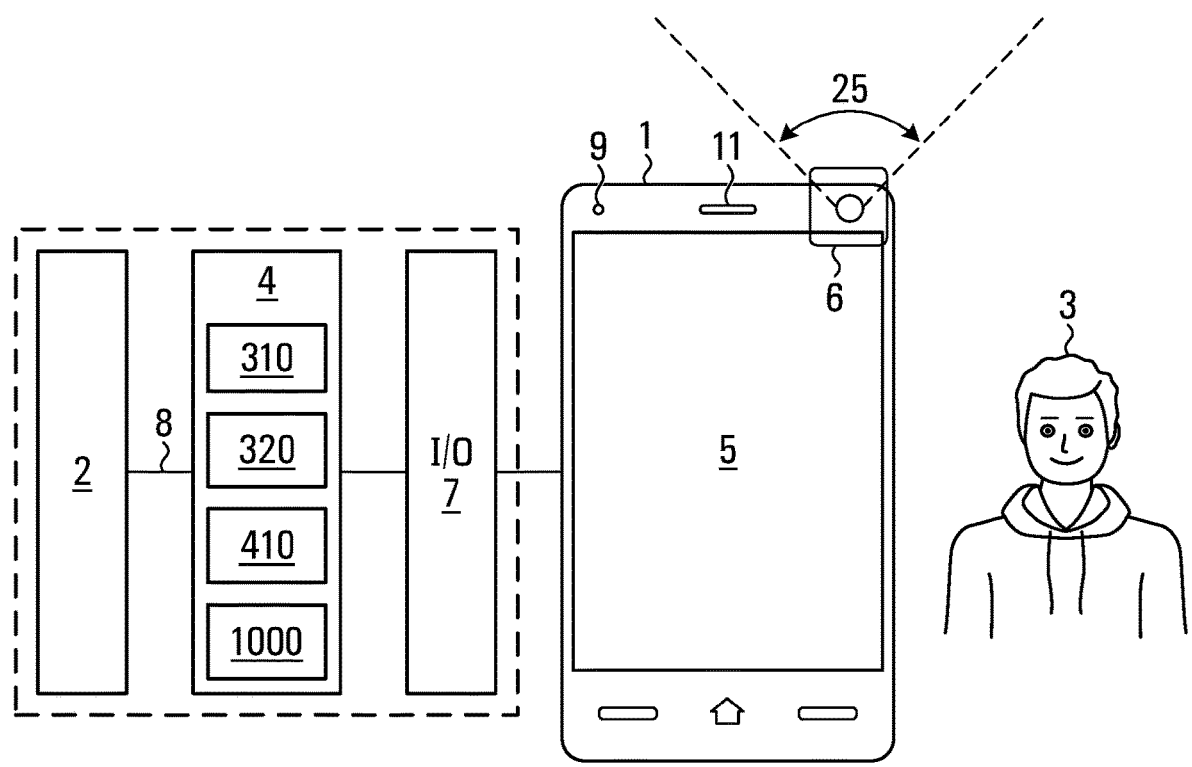
FIG. 1 is a block diagram showing a gaming device that runs an interactive computer game including a virtual agent communication process, in accordance with a non-limiting embodiment.

Reference is made to FIG. 1, which illustrates a gaming device 1, such as a game console, tablet or smartphone, implementing a computer game. The computer game is, in essence, an interactive computer program defined by computer-readable instructions stored in a memory 4 and read and executed by at least one processor 2. The at least one processor 2 can include one or more central processing units (CPUs) and/or one or more graphics processing units (GPUs). A bus 8 may allow communication between the at least one processor 2 and the memory 4.

In a simple non-limiting example embodiment, the interactive computer program defined by the computer-readable instructions includes a game process (or game loop) and a rendering process, both of which are run by the at least one processor 2.

Most of the rendering process is asynchronous (especially if executed by the graphics processing unit—GPU) to the game loop, however the final output is a framebuffer (array of pixels) that is displayed on the screen 5 at a regular frame rate (24 fps, 30 fps, 60 fps). Sound output via a loudspeaker 11 is typically managed by the game loop on the main thread (on the CPU) with other pieces of hardware dealing with input and output (i.e. DAC—digital to audio conversion). The screen 5 and the loudspeaker 11 may be connected to the at least one processor 2 via an input/output interface (I/O) 7 and the bus 8. The images and sounds are related to various game objects whose properties and positions stored in the memory 4. Examples of game objects include player characters (PCs) and non-player characters (NPCs).

Each of the game objects may be characterized by a set of properties and a position in a 3D virtual space, maintained in the memory 4. The position of a game object may be encoded as a set of coordinates occupied by the game object in the 3D virtual space. The set of properties for a game object may include a description of the game object. Also, the set of properties for a game object may include an indication of whether the game object is a real-world object or a virtual object. A real-world object refers to a game object that exists in the real world (in the physical world of the user 3, e.g., as may be photographed by a camera) and is ultimately placed into the 3D virtual space maintained in the memory 4, whereas a virtual object refers to a game object that only ever exists in the 3D virtual space.

A user 3 provides user inputs via at least one input device (including one or more of a joystick, touchscreen 5, keyboard, controller, microphone 9, camera 6 and/or gesture sensor, for example). The at least one input device may be connected to the at least one processor 2 via the I/O 7 and the bus 8. As part of executing the game process (sometimes referred to as "game loop" or "game logic"), the inputs received from the user 3 are processed, which results in changes to the properties and positions of the game objects as stored in the memory 4. When this changed data is processed by the game and render loops/processes, this results in changes to the images being rendered on the screen 5 and new sounds being produced by the loudspeaker 11. These outputs provoke the user 3 into responding by making further inputs vie the at least one input device, and so on.

As part of the CPU game loop, the at least one processor 2 is also configured to acquire/retrieve a time sequence of images from a camera 6 or other image capture device that may be integral with or connected to the gaming device 1. The at least one processor 2 is configured to register the objects found in the 2D camera images (acquired from the camera 6) within the 3D virtual space, and render 2D camera images juxtaposed with rasterized virtual objects (i.e., rendered 2D representations of a subset of the virtual objects in the 3D virtual space, namely those that appear within the camera/view frustum 25 as applied to the 3D virtual space). The resulting composite rendered image is referred to as an augmented reality (AR) scene, and gives the user 3 the impression that certain virtual objects are actually in the field of view FOV of the camera 6. The camera 6 itself has a position in the 3D virtual space.

The acquired camera images may contain machine-recognizable real-world objects that the at least one processor 2 may attempt to identify through the running of computer vision algorithms. Specifically, the at least one processor 2 may execute a computer vision algorithm that attempts to identify known objects by examining shapes, colors and/or textures (patterns) in the acquired images from one or more perspectives. Combining the output of the computer vision algorithm with the camera data and the AR representation of the real world, it is possible to compute a 3D shape and position for a real-world object. In so doing, the real-world objects can be precisely registered within the 3D virtual space. This allows the definition of contours and barriers of real-world objects in the 3D virtual space that are taken into account by the rendering process when rendering virtual objects for display in the composite images on-screen.

Figure 2:
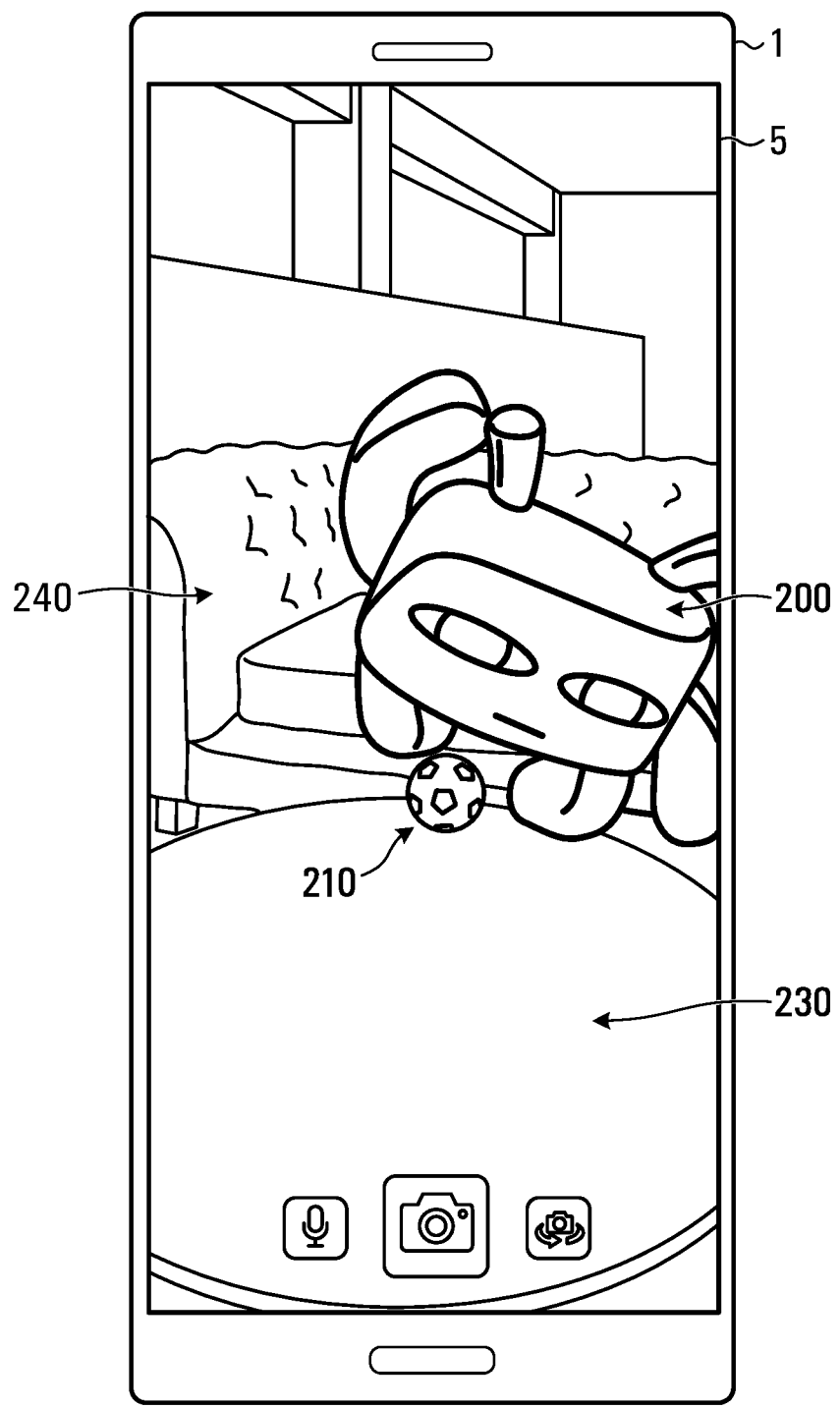
FIG. 2 depicts a screenshot comprising an interactive virtual agent, in accordance with a non-limiting embodiment.

With additional reference to FIG. 2, there is shown an example composite image on the screen 5 of the gaming device 1, showing an AR scene. The composite image is a blend of the 2D image captured by the camera 6 (including real-world objects) and a rendered graphical representation of the virtual world (which may include a plurality of virtual objects), from the perspective of the camera in the 3D virtual space.

One of the real-world objects in this AR scene is shown at 230 and may be perceived by the user 3 as a table. Another one of the real-world objects is shown at 240 and may be perceived by the user 3 as a couch/sofa. The couch/sofa 240 is at a further distance from the camera 6 than the table 230, and therefore correspondingly has a further location from the position of the camera 6 in the 3D virtual space.

One of the virtual objects defined in the 3D virtual space is shown at 210 in this AR scene and may be perceived by the user 3 as a soccer ball. Another one of the virtual objects in this AR scene is shown at 200 and may be referred to as a "virtual agent".

The virtual agent 200 occupies coordinates in the 3D virtual space, just like any other virtual object. In addition, to provide graphical realism, the virtual agent 200 may be rendered to have a somewhat realistic "body" capable of movement and a somewhat realistic "face" capable of making facial expressions. A voice signature may also be associated with the virtual agent 200. In certain examples, the virtual agent 200 may take the form of a human, an animal, an android or a completely fictional creature.

Figure 8:
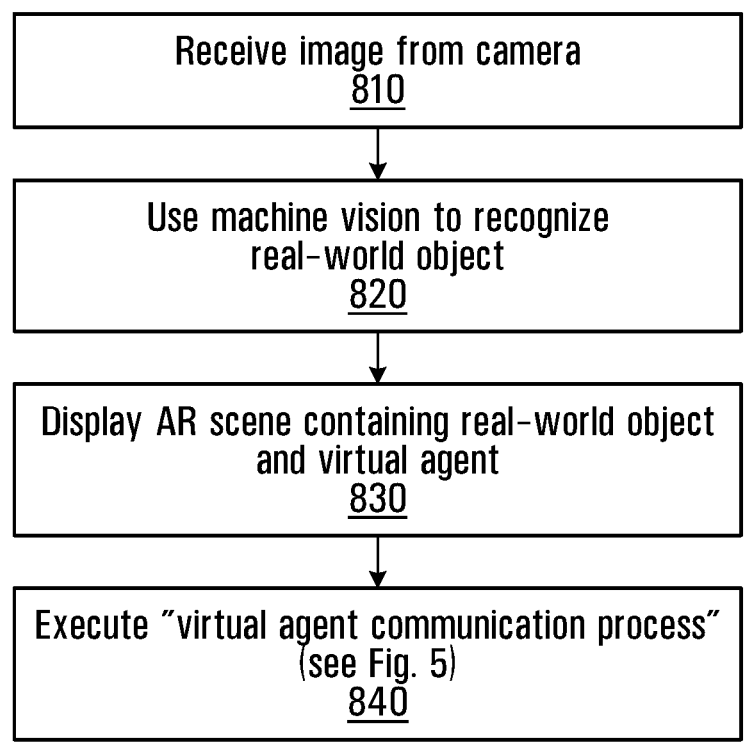
FIG. 8 is a flowchart of steps in a method that may be implemented by a processor of a computing device such as a gaming device.

FIG. 8 is a flowchart illustrating steps in a method that may be implemented by the at least one processor 2 of the gaming device 1. Specifically, the memory 4 stores a subset of computer readable instructions which, when executed by the at least one processor 2, causes the at least one processor 2 to execute the method.

At step 810, an image (or a sequence of images at a frame rate) is received from the camera 6. In this example, the image includes at least one real-world object, but this fact is not yet known to the at least one processor 2. Accordingly, at step 820, a machine vision process is used to recognize the at least one real-world object in the image. As a result of step 820, the real-world object may also be placed into the 3D virtual space. At step 830, a composite image that contains both the real-world object and a rendered graphical representation of a virtual agent 200 may be displayed on the screen 5. This may be referred to as an "AR scene".

At step 840, a "virtual agent communication process", namely a process for communicating with the virtual agent 200, is executed. This will be described in detail further below with reference to FIG. 5. Generally speaking, according to embodiments of the virtual agent communication process, the virtual agent 200 is animated (i.e., rendered as a changing image on the screen 5 of the gaming device 1) so as to give the appearance of "reacting" to user phrases received from the user 3 of the gaming device 1. Animation of the virtual agent 200 may involve apparent "movements" of parts of the virtual agent 200 that appear to take into consideration properties (e.g., dimensions, locations and other properties) of game objects, including virtual objects and real-world objects. In particular, animation of the virtual agent 200 in reaction to user input may be adapted to any real-world objects that were detected by a machine vision process as being present in the AR scene.

Figure 3A:
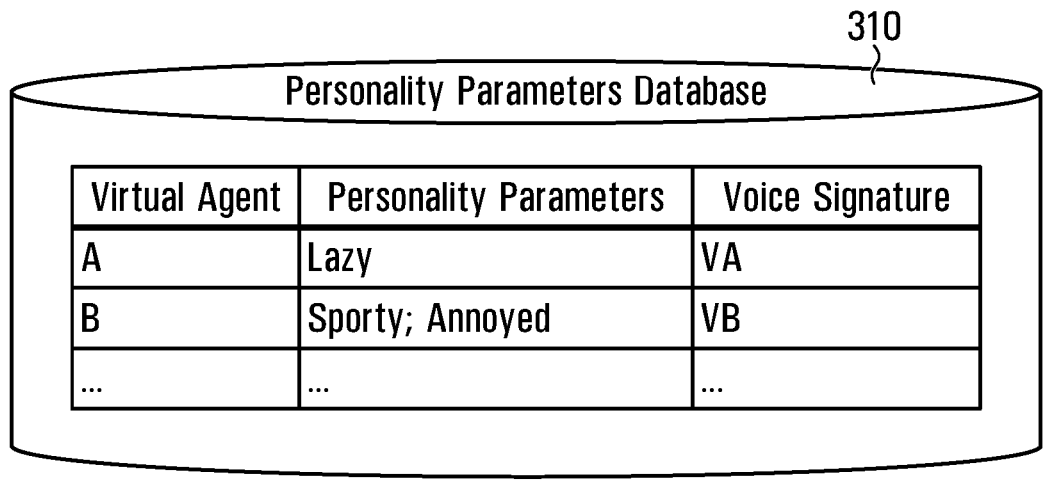
FIG. 3A is a diagram conceptually illustrating contents of a personality parameter database, in accordance with a non-limiting embodiment.

The reaction of the virtual agent 200 may be a function of one or more "personality parameters" associated with the virtual agent 200. With reference now to FIG. 3A, the personality parameters may be stored in a personality parameter database 310. In a non-limiting example, the personality parameters associated with the virtual agent 200 may include a selection from a list of behavior types for the virtual agent 200, such as "sporty", "goofy", "violent", "lazy", "annoyed", etc. A given virtual agent may be associated with more than one personality parameter, and these personality parameters may change dynamically (i.e., over time) depending on a variety of factors.

The personality parameters associated with the virtual agent 200 are used to provide an indication of how to animate the virtual agent 200. In some embodiments, the personality parameters provide an indication of how to modulate facial expressions and body movement of the virtual agent 200 in general. For example, in the case where the personality parameters include a behavior type that is "sporty", animation of the virtual agent 200 may cause virtual agent 200 to exhibit swift, athletic maneuvers.

In some embodiments, the personality parameters provide an indication of how to modulate facial expressions and body movement of the virtual agent 200 in response to various circumstances. For example, in the case where the personality parameters include a behavior type that is "disobedient", animation of the virtual agent 200 may cause virtual agent 200 to respond to a command to fetch an object by appearing toss it away, play with it himself, fetch another object entirely, etc.

In some embodiments, the personality parameters may indicate whether to animate the virtual agent 200 in the first place.

The virtual agent 200 may also be associated with a voice signature. The voice signature may also be stored in the personality parameter database 310. The voice signature associated with the virtual agent 200 may provide an indication of how to modulate audio output associated with the virtual agent 200. In one non-limiting example embodiment, the voice signature may be encoded as a set of LPC parameters specific to the virtual agent 200.

Figure 3B:
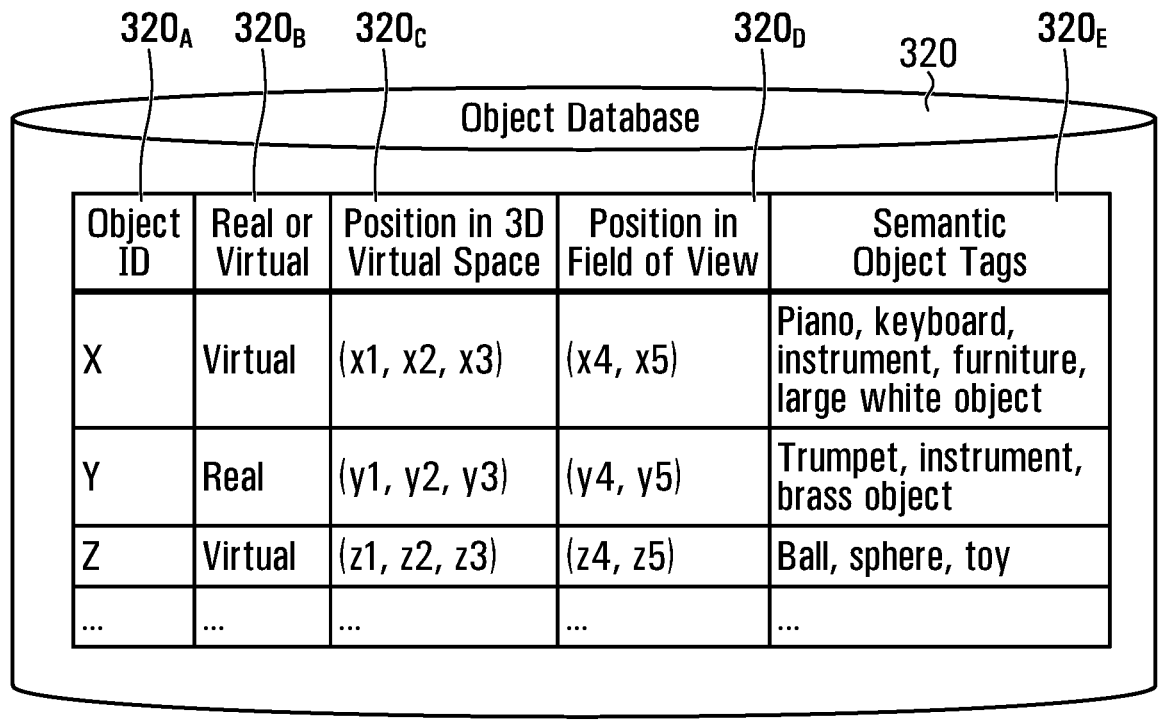
FIGS. 3B and 3C are diagrams conceptually illustrating contents of an object database, in accordance with non-limiting embodiments.
Figure 3C:
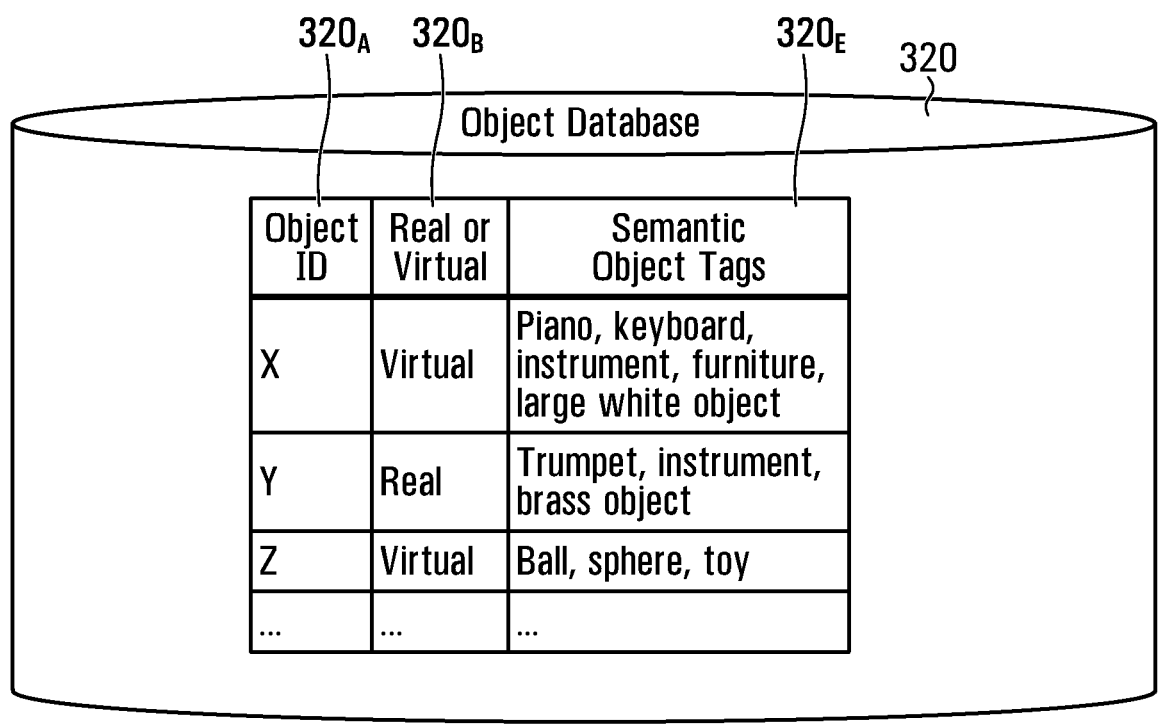

To facilitate object tracking in the 3D virtual space, and with reference to FIGS. 3B and 3C, an object database 320 is provided. The object database 320 maintains data fields related to various real-world objects and virtual objects. To this end, one data field 320A may be a unique object identifier (object ID) and another data field 320B may indicate whether the game object is a real-world object or a virtual object.

Optionally, as shown in FIG. 3B (but not in FIG. 3C), another data field 320C may indicate the position of the game object in the 3D virtual space (e.g., X, Y and Z coordinates and/or associations with game levels, zones or other objects). By applying the computer vision algorithm to the camera data and combining the output with the AR (virtual) representation of the real world, it is possible to compute a 3D shape and position for a real-world object. In other embodiments, position data for the object resides in another database that stores more general properties of each object and where position data is one such property. A further optional data field 320D may be also associated with each game object, which indicates the position of the game object in the camera/view frustum 25. However, this field can be omitted because the information it contains can be derived from the position of the camera 6 in the virtual 3D space (and the direction in which it faces), combined with the position of the game object in the 3D virtual space.

A still further data field 320E associated with each game object may indicate one or more "semantic object tags" associated with the game object. The semantic object tags associated with a particular game object may be word expressions which, if included in a user phrase, may potentially designate the particular game object. Such word expressions may include synonyms as well as semantic equivalents at different levels of abstraction. For example, a game object that the user may perceive as a white-colored grand piano (irrespective of whether it is virtual or real) may be associated with a plurality of semantic object tags, including [piano], [keyboard], [instrument], [furniture] and [large white object]. In another example, a game object that the user may perceive as a trumpet may be associated with a plurality of semantic object tags, including [trumpet], [instrument] and [metallic object]. This demonstrates that there can be multiple semantic tags with for the same game object and multiple game objects with the same semantic tag (in this case, [instrument]).

In some cases, the semantic object tags for a specific game object may change dynamically as their association to the specific game object may be dependent on, for example, other objects that happen to be currently in (or outside) the view frustum of the camera 6. For example, the semantic object tag [biggest object in the room] may, at different times, be associated with different objects, depending on what is currently in the view frustum of the camera 6. A background process for managing the object database 320 (and specifically the association of semantic object tags to real-world objects or virtual objects) may be carried out by the at least one processor 2.

It will be appreciated that there is an almost limitless set of user phrases that the user 3 may decide to use when attempting to "communicate" with the virtual agent 200. However, during gameplay, it is expected that despite this wide array of possibilities, the user 3 will be interested in conveying one of a limited number of possible intents. Intents may be various greetings, commands (e.g., fetch, attack, . . . ) and acknowledgements. To convey a particular intent, the user 3 uses words. Specifically, the user 3 inputs (either verbally or in writing) certain word expressions (referred to as "intent identifiers") that are strategically placed in the user phrase. For example, in order for the user to convey an intent that is a command for the virtual agent 200, the user input 3 may include an intent identifier that includes a transitive verb in the imperative tense (such as [get], [sit], [bring], [push], . . . ).

Figure 4:
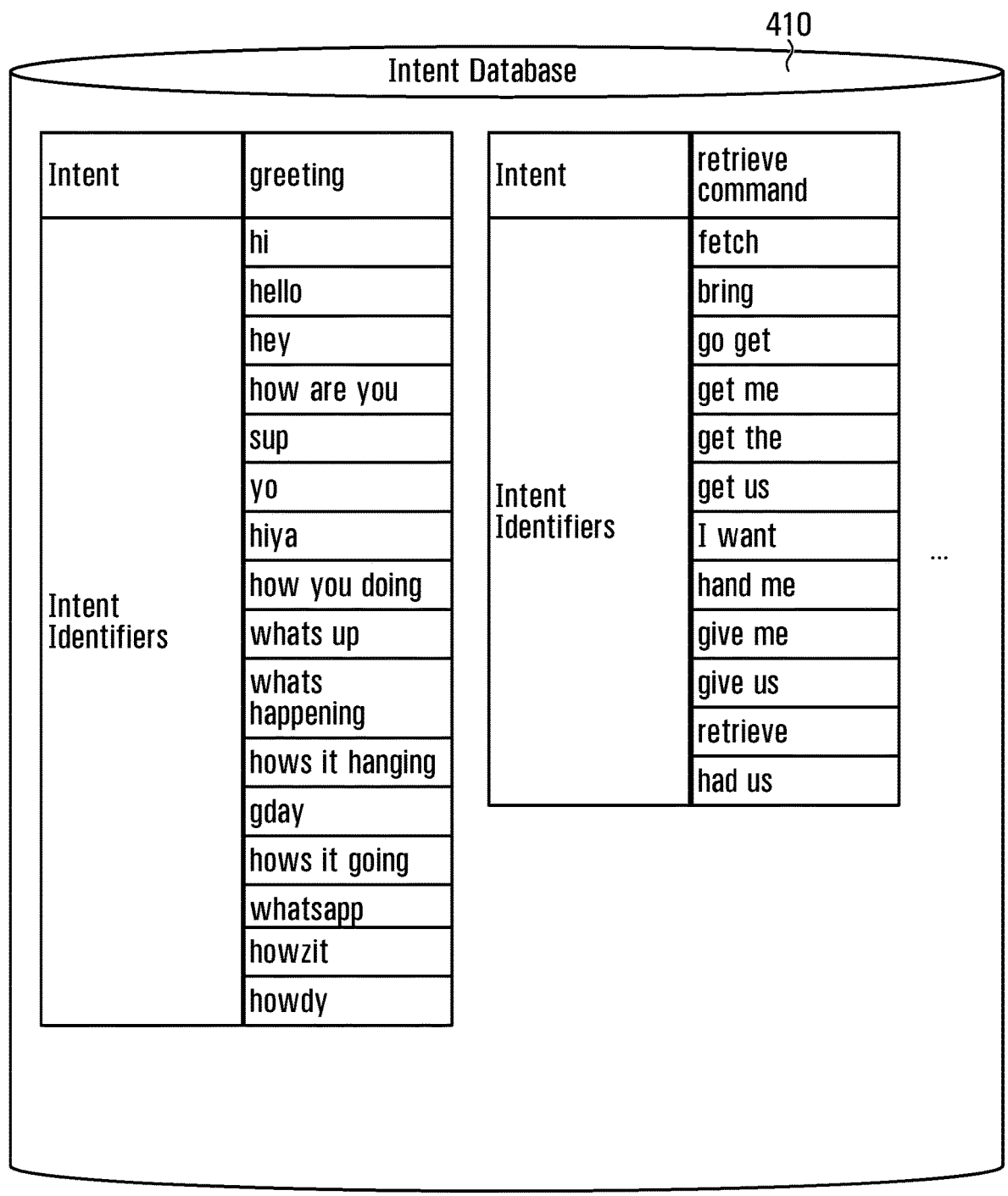
FIG. 4 is a diagram conceptually illustrating contents of an intent database, in accordance with a non-limiting embodiment.

Reference is now made to FIG. 4, wherein an intent database 410 lists various intents. Each particular intent is mapped to several possible intent identifiers which, if they appear in the user phrase, are interpreted as conveying the particular intent. The intent identifiers associated with a given intent can be stored in the intent database 410 as words and syllables that appear in common parlance in a given language such as English or Japanese. The use of multiple languages may support a wider user base, but only a limited number languages is actually in use by the user at any given time. To assist in the selection of a default language, the selected language may be localized based on a parameter such as, for example, the geographic location or IP address of the device. In alternate embodiments, the intent identifiers may be stored in the intent database 410 as phonemes (in the case where the user input is verbal).

Figure 5:
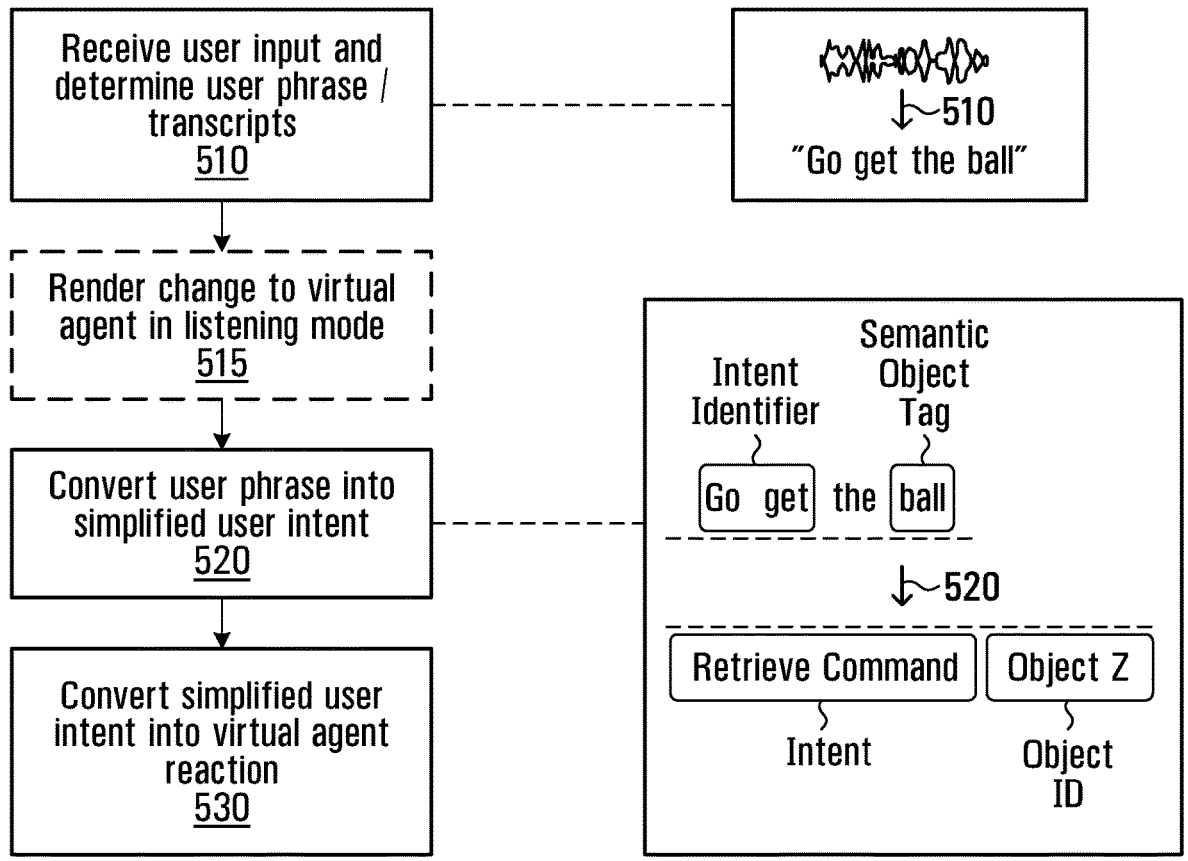
FIG. 5 is a flowchart illustrating steps in the virtual agent communication process, in accordance with a non-limiting embodiment.

The virtual agent communication process (step 840 in the method shown in FIG. 8) is now described in further detail with reference to FIG. 5.

Step 510: The virtual agent communication process begins by receiving user input from the user 3 and determining a word-containing user phrase from the user input (e.g., "go get the ball"). The user input may be entered either verbally (e.g., via the microphone 9) or as text (e.g., via a keyboard or touchscreen 5). In the case of user input entered as text, the virtual agent communication process may carry out spell-checking, grammar-checking and/or translation of the text to obtain the user phrase containing words. In the case of user input entered verbally (i.e., an utterance), the virtual agent communication process may include detecting that the user 3 has started making an utterance, and applying speech-to-text processing (e.g., a speech API) to the subsequently received sound in order to obtain the user phrase. Language processing of various types may be applied in order to properly identify the uttered words. This may include using multiple language support, speech recognition and speaker recognition technologies, as well as translation and reference to idiomatic equivalencies. It is noted that using a native speech API can avoid having to transmit audio files to a remote server. In some embodiments, step 510 may result in the production of a plurality of transcripts, each transcript containing a different user phrase (i.e., a different set of words) and an associated confidence level.

Figure 6:
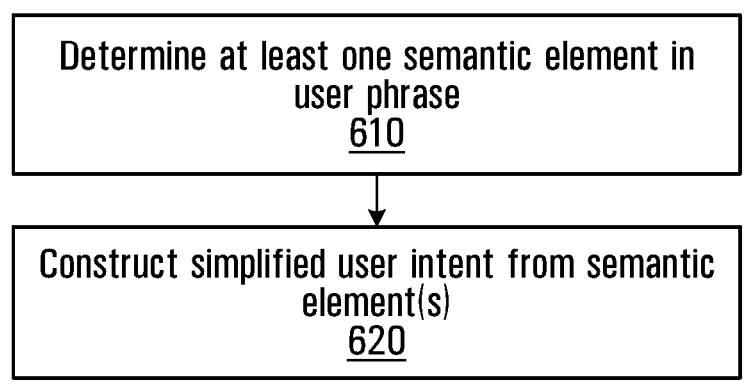
FIG. 6 is a flowchart illustrating sub-steps corresponding to one of the steps in the virtual agent communication process, in accordance with a non-limiting embodiment.

Step 520: The virtual agent communication process includes converting the user phrase into a "simplified user intent". Specifically, and as shown in further detail in the flowchart of FIG. 6A, this conversion of the user phrase may include:

Sub-step 610: Determining at least one semantic element from the words in the user phrase.

Specifically, the at least one semantic element may include one or more intent identifiers and/or at least one semantic object tags. As such, this step may attempt to recognize, in the user phrase, at least one of the various intent identifiers stored in the intent database 410 and/or the various semantic object tags stored in the object database 320. For instance, as shown in FIG. 5, in the user phrase "go get the ball", the semantic elements could be the intent identifier [go get] and the semantic object tag [ball]. In some cases, words in the user phrase that may not be matched to an intent identifier or to a semantic object tag may be ignored. For instance, in the user phrase "Could you please fetch the ball", the semantic elements could be the intent identifier [fetch] and the semantic object tag [ball], with all other words in the user phrase being considered superfluous.

By way of non-limiting example, FIG. 9A shows some non-limiting examples of user phrases and corresponding semantic elements that could be extracted therefrom.

Sub-step 620: Constructing the simplified user intent from the semantic element(s) determined at sub-step 610. The simplified user intent is stored in the memory 4 of the gaming device 1. For example, FIG. 5 shows the intent identifier [go get] being converted to the intent [retrieve command] (based on the many-to-one mapping stored in the intent database 410) and the semantic object tag [ball] being converted to the object identifier [object Z] (based on the many-to-one mapping stored in the object database 320).

By way of non-limiting example, FIG. 9B shows examples of semantic elements and the simplified user intent that could be constructed from these semantic elements. FIG. 9C is a combination of FIGS. 9A and 9B, showing user phrases, the corresponding semantic elements that could be extracted therefrom, and the resulting simplified user intent.

In an example, the semantic element(s) determined at sub-step 610 may include a single intent identifier (such as a greeting). In this case, the "simplified user intent" output at sub-step 620 can be the intent associated with this single intent identifier as determined from the intent database 410. See, for example, row 910D in FIG. 9C, where the simplified user intent includes the intent [greeting] based on the user phrase "Hi!".

In another example, the semantic element(s) determined at sub-step 610 may include one intent identifier and one or more semantic object tags (such as a command to fetch an object). The corresponding one or more intents (obtained from the intent database 410) and the corresponding one or more object identifiers (obtained from the object database 320) may be combined (e.g., concatenated) to form the simplified user intent. See, for example, row 910B in FIG. 9C, in which the simplified user intent includes the intent [attack] and the object identifier [object Y].

As there may be many objects in the 3D world whose object identifiers map to the same semantic object tag (e.g., many objects that could potentially be associated with the semantic object tag [instrument] as described earlier), a validation step may be executed in order to verify that the objects meet certain criteria before being considered for inclusion in the simplified user intent. Such criteria could include a requirement that the object appear in the camera/view frustum 25.

In still other examples, the semantic element(s) determined at sub-step 610 may include more than one intent identifier (e.g., when the user has input both a greeting and a command); in such cases, a single corresponding intent (obtained from the intent database 410) intent may be preserved in the simplified user intent, according to a definable prioritization logic or heuristic. For instance, where there are two intent identifiers, one whose associated intent is a fetch command and the other whose associated intent is a greeting (e.g., "Hi! Could you please fetch the ball"), the processing logic may prioritize the fetch command over the greeting so that only the fetch command is retained in the simplified user intent. See, for example, row 910E in FIG. 9C, where the simplified user intent includes the intent [interact command] even though the semantic elements included both [play] and [piano].

It should be appreciated that the object identifiers in the simplified user intent may correspond to both real-world and virtual objects, which are shown on the screen 5 and co-exist in the 3D virtual space. Accordingly, the virtual agent 200 is configured to seemingly recognize and interact with not only virtual objects, but also real-world objects. Whereas real-world objects may be apparent to the human user 3 by merely appearing in an image captured by the camera 6, they must first be properly recognized by a machine vision algorithm and placed into in the 3D virtual space (see step 820 in FIG. 8) before the virtual agent 200 can seemingly recognize them and interact with them. Also, the interaction may depend on specific properties of the real-world objects as obtained from the object database 320.

In the case where an intent identifier or a semantic object tag appears to be missing from the user phrase, the simplified user intent may be deemed "unknown" or "incomplete" (which could elicit a reaction of, for example, a "shoulder shrug" from the virtual agent 200—this and other possible reactions by the virtual agent 200 are described further below). See, for example, row 910F in FIG. 9C.

In cases where there is an inconsistency (for example, a semantic object tag associates to an object that is not in the camera/view frustum 25), the simplified user intent may be deemed "invalid". Alternatively, the inconsistency may be maintained and the semantic object tag, although inconsistent, appears in the simplified user intent. In this case, even though the resulting simplified user intent may appear nonsensical (e.g., by referencing a game object that is not visible on-screen), this may be permissible as it could lead to humorous or interesting situations.

Figure 7A:
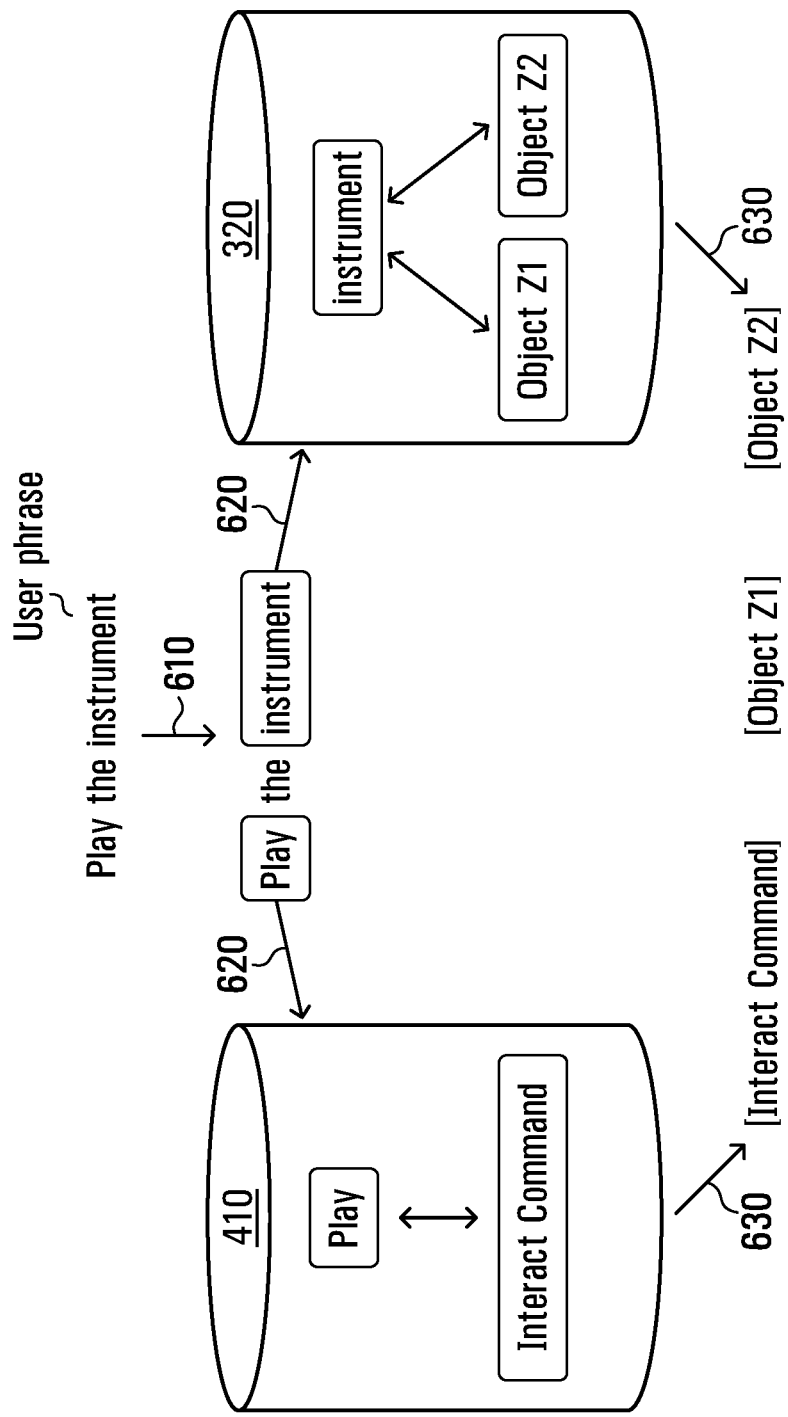
FIGS. 7A and 7B are diagrams depicting conversion of a user phrase into simplified user intent, according to non-limiting variants.

It should be appreciated that in some cases, the same semantic object tag may map to multiple object identifiers. For example, with reference to FIG. 7A, the semantic object tag [instrument] may not allow disambiguation between an object Z1 (e.g., which the user 3 may perceive as a "trumpet") and an object Z2 (e.g., which the user 3 may perceive as a "piano") when both objects Z1 and Z2 are in the view frustum 25. The at least one identifier for the semantic object tag [instrument] may thus include two object identifiers ([object Z1] and [object Z2]). Also see, for example, row 910C in FIG. 9C, where although the user phrase referred to a single "book", the simplified user intent includes two object identifiers, namely [object Z3] and [object Z4].

It should also be appreciated that in the case where Step 510 produces multiple transcripts, each with a different user phrase (at a different confidence level), Step 520 (conversion into a simplified user intent) may be performed for each such user phrase. It is possible that the simplified user intent created from multiple different transcripts ends up being the same. The confidence level associated with a common simplified user intent derived from multiple transcripts could be the sum of the confidence levels of the original transcripts. A comparison of the resulting summed confidence levels could allow selection of one simplified user intent to be employed in later steps. As such, the virtual agent communication process may comprise the step of selecting a dominant simplified user intent from among a plurality of candidate simplified user intents obtained for different respective transcripts of the user input.

Step 530: The virtual agent communication process includes converting the simplified user intent into a "reaction" of the virtual agent 200. In an embodiment, the diversity of the various possible simplified user intent produces a wide range of possible reactions. The reaction may include animations, navigation/displacement of the virtual agent 200 (or one or more props/other agents), as well as audio output. This could be entertaining for the user 3 and could elicit further user input and further attempts at "communicating" with the virtual agent 200.

In the case where the simplified user intent conveys a command, the virtual agent 200 may be animated so as to exhibit apparent movement that evokes carrying out the command. In the case where the simplified user intent conveys a command in relation to a particular game object, the virtual agent 200 may be animated so as to exhibit an apparent movement of the virtual agent 200 in relation to the particular game object that evokes carrying out the command.

Figure 7B:
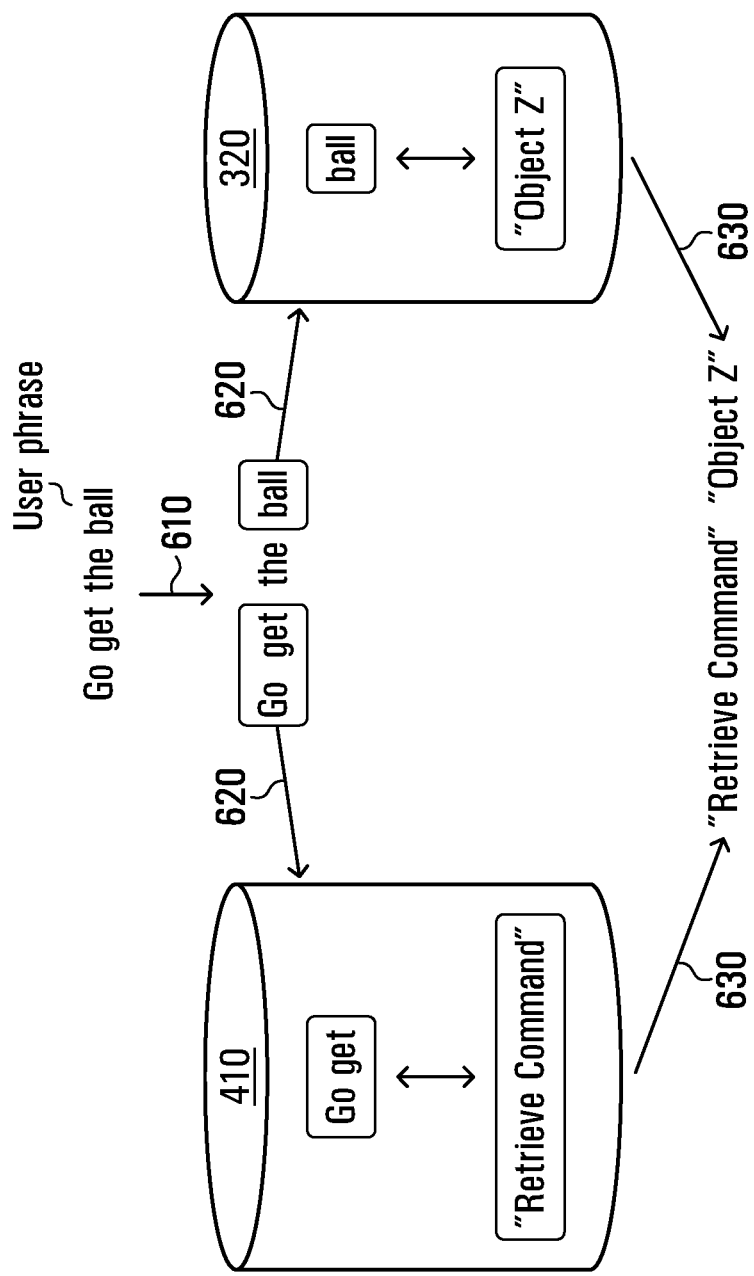

For example, consider FIG. 7B, in which the simplified user intent [Retrieve Command][Object Z] was derived from the user phrase "Go get the ball". The simplified user intent includes the intent [Retrieve Command] and the object identifier [Object Z]. This simplified user intent signifies a command to retrieve a game object with object identifier Z. Then, animating the virtual agent 200 to exhibit a reaction to the simplified user intent could result in causing the virtual agent 200 to appear to move from the camera position towards the game object. It is recalled that the game object (e.g., a ball) may be a real-world object (e.g., a real-world ball) or a virtual object (e.g., a virtual ball) in the AR scene. For example, in the case where the object Z is a virtual ball, the virtual agent 200 may be animated so as to appear to take possession of the virtual ball and bring it back towards the camera position. Alternatively, in the case where object Z is a real-world ball, the virtual agent 200 may be animated so as to appear to struggle to take possession of the real-world ball; however, because the object Z is a real-world object, it cannot be brought back towards the camera position. However, in variant, digital photo-manipulation software could be used to "erase" the real-world ball from the AR scene and a virtual object resembling the real-world ball is created and the newly created virtual ball can be "brought" back to the camera position by the virtual agent 200.

In an embodiment, animating the virtual agent 200 so as to exhibit a "reaction" may be preceded by animating the virtual agent 200 so as to exhibit a perceived gesture of acknowledgement (such as perceived nodding of the head) on the screen 5 of the gaming device 1. Alternatively, animating the virtual agent's reaction may be preceded by animating the virtual agent 200 so as to exhibit a perceived gesture of disapproval.

Animation of the virtual agent 200 so as to exhibit a reaction to the simplified user intent, as rendered on the screen 5 (and/or via the loudspeaker 11), may be affected by various other factors:

(a) Animation of the virtual agent 200 in the context of a reaction to the simplified user intent may include a movement pattern that is consistent with the personality parameter(s)/behavior type associated with the virtual agent 200 as obtained from the personality parameter database 310. As a result, the virtual agent 200 may be animated so as to exhibit specific body movements and/or facial expressions that the user 3 may find interesting or entertaining.

For example, if the behavior type of the virtual agent 200 is "sporty", then when the virtual agent 200 is asked to retrieve a ball, instead of being animated so as to appear to carry the ball, the virtual agent 200 may be animated so as to appear to throw it, and the ball may be rendered as appearing to be thrown. Alternatively, if the behavior type of the virtual agent 200 is "disobedient", then the virtual agent 200 may be animated so as to appear to refuse to cooperate (e.g., without even approaching the ball in the first place and possibly by perceived shaking of its head to convey disapproval). Of course, there are only examples of possible behavior types; others will occur to those of skill in the art.

Figure 10:
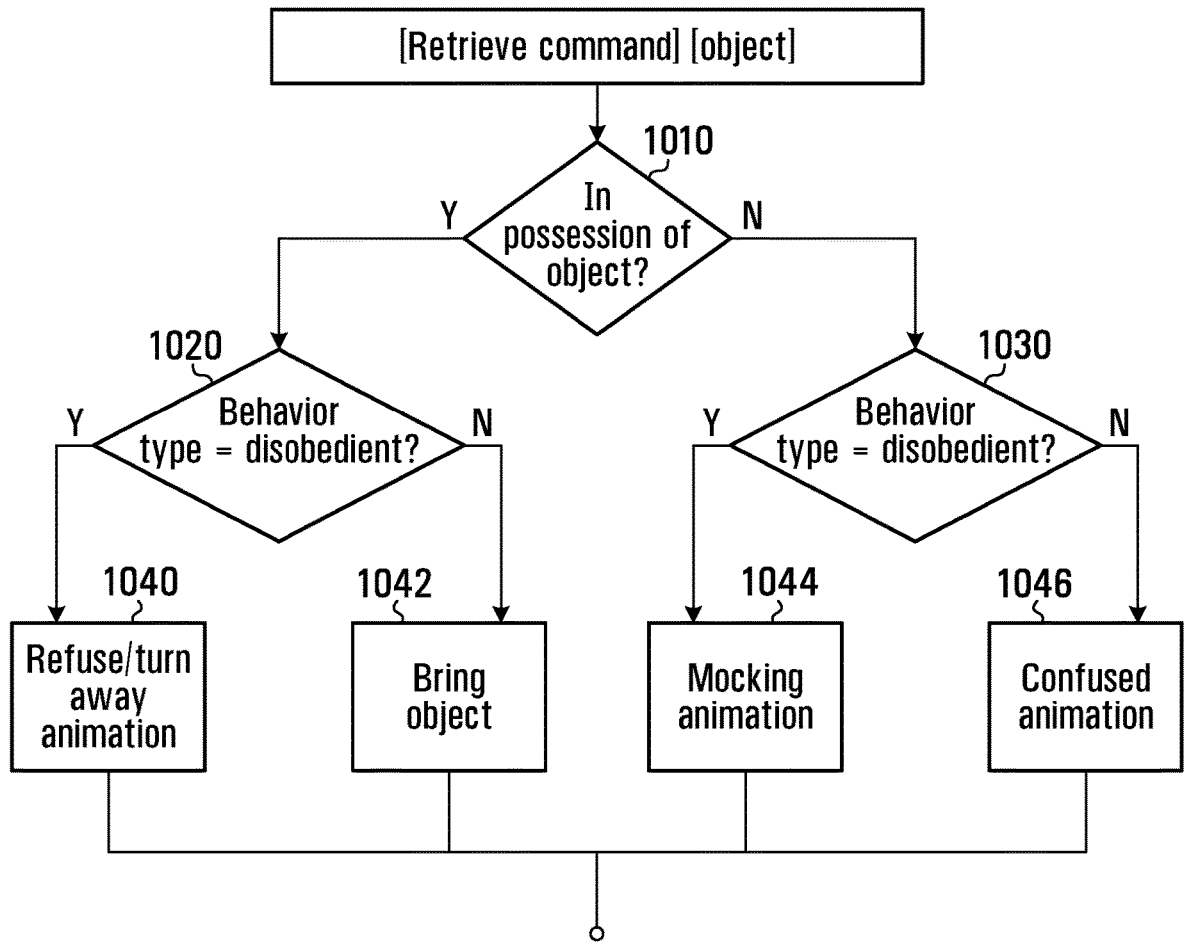
FIG. 10 is a flowchart referred to as a behavior tree, for triggering animations depending on a behavior type in the personality parameter database, in accordance with a non-limiting embodiment.
Figure 11:
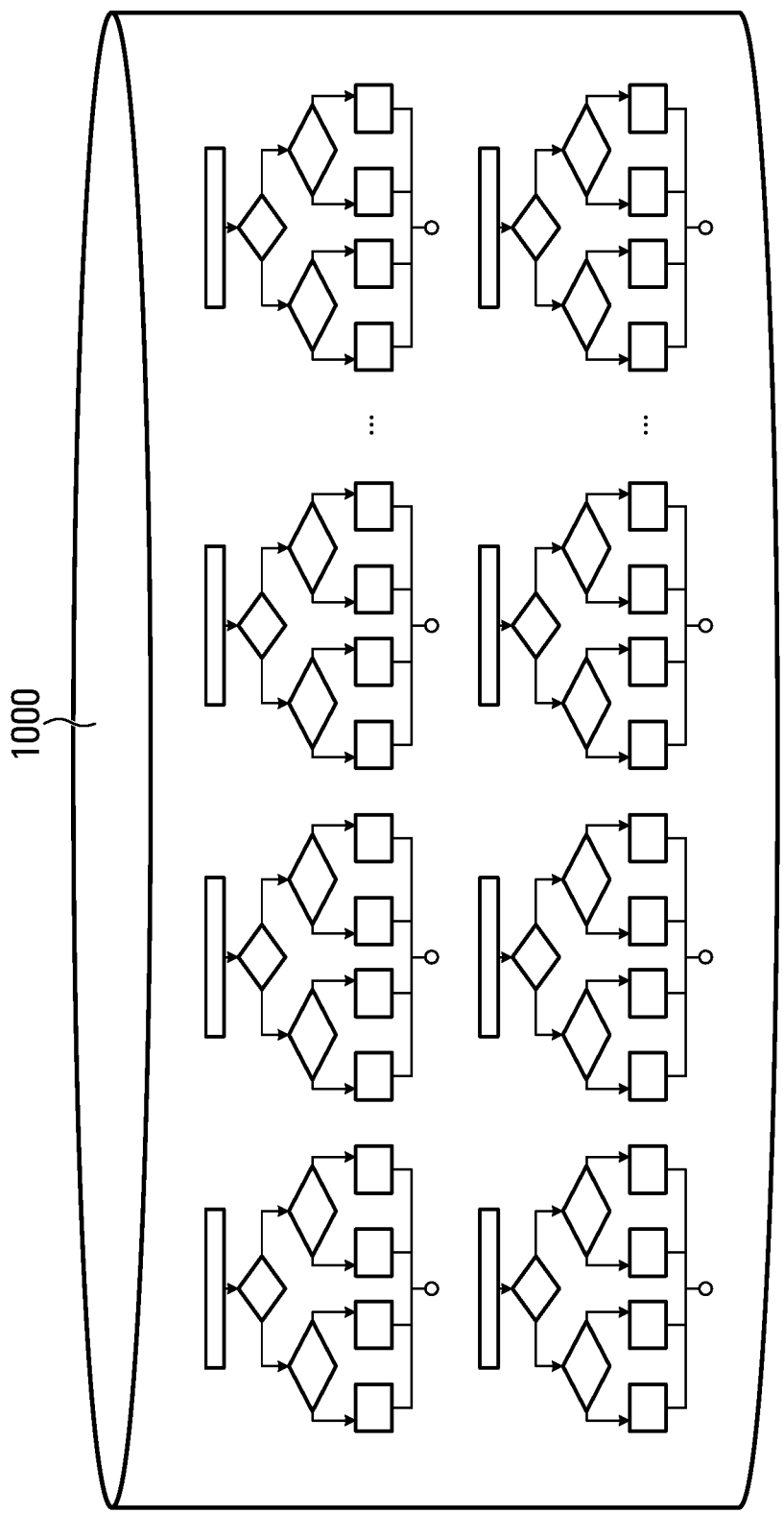
FIG. 11 conceptually shows a database that includes a plurality of behavior trees used in response to various combinations of simplified user intent.

One way to codify the various potential reactions to simplified user intent for various behavior types is using a system of "behavior trees", an example of which is shown in FIG. 10. Specifically, this simple illustrated behavior tree 1000 handles the simplified user intent [retrieve command] [object], resulting from a user input interpreted as a command to retrieve a particular game object. The behavior tree 1000 may be one of several hundred or thousand stored in the memory 4 (see FIG. 11).

According to this behavior tree, step 1010 includes determining whether the virtual agent is in possession of the object identified in the simplified user intent and, if so, proceeding to step 1020, otherwise proceeding to step 1030. Determining whether the virtual agent is in possession of a particular game object is known from the game logic. Then, regardless of whether step 1020 or step 1030 is performed, the same question is asked, namely whether the behavior type of the virtual agent is disobedient; however, the outcome will differ, depending on whether the virtual agent was or was not in possession of the object identified by the simplified user intent.

As such, in the event that the virtual agent is in possession of the object and is disobedient, the at least one processor may carry out a refuse/turn away animation (which can be pre-canned). In the event that the virtual agent is in possession of the object and is not disobedient, the at least one processor may animate the virtual agent bringing the object towards the camera. In the event that the virtual agent is not in possession of the object and is disobedient, the at least one processor may carry out a "mocking" animation (where the virtual agent appears to mock the user 3, seemingly to point out that the command is not logical). In the event that the virtual agent is not in possession of the object and is not disobedient, the at least one processor may carry out a "confused" animation (seemingly to express that there is indeed nothing to be retrieved).

Instead of being modeled as sequential binary-outcome questions, steps 1010, 1020 and 1030 can be modeled as a bivariate switch case. Again, it is emphasized that the behavior tree 1000 models a simplified behavior tree and that much more complex behavior trees can be implemented by those of skill in the art. For example, the behavior tree may have branches that depend on the physical characteristics (e.g., size) of the virtual agent.

As such, it should be apparent that the setup of each individual behaviour tree and how it handles different behavior types, including possibly additional branches that trigger certain animations based on physical characteristics of the virtual agent, is what gives each virtual agent a "personality", as the same behaviors are executed consistently for the same behavior type.

It should also be appreciated that there may be multiple behavior types associated with the virtual agent, and the associated behavior types can change over time. For example, the virtual agent may be associated with the behavior type "sporty" and the behavior type "disobedient". Assuming now that the virtual agent is fed its favorite food (as per the game logic), the "sporty" behavior type might not change, but the "disobedient" behavior type may be deleted, as the virtual agent will have been appeased. Each behavior type or combination of behavior types may trigger a different path along the behavior tree for different combinations of simplified user intent.

The associated behavior types can also change through user actions. For example, tapping multiple times onto the location where the virtual agent appear on the screen 5 could cause the behavior type of the virtual agent to become (or change to) "annoyed", which could lead to a series of other animations for different combinations of simplified user intents, depending on the contents of the associated behavior tree.

In the above examples of embodiments, the behavior types are described as binary, i.e., the virtual agent is either sport or it is not, and is either disobedient or is not. In other examples of embodiments, the behavior types may be graded, for example, sportiness or disobedience can be a matter of degree (on a scale of 1 to 10), and different branches of the behavior tree may be taken for different levels of the same behavior type.

(b) The simplified user intent may require disambiguation. For example, even though the user phrase may have been found to contain a single semantic object tag, the simplified user intent may contain multiple object identifiers as a result of it not having been possible to ascertain, at step 520, which of several objects the user 3 intended to specify. Stated differently, the virtual agent communication process may determine that the number of semantic object tags at the output of sub-step 620 is less than the number of object identifiers at the output of sub-step 610; this will be an indication that disambiguation is required. At this point, several options are possible. In one embodiment, the virtual agent communication process may choose the required number object identifiers at random. In another embodiment, the virtual agent communication process may choose the required number object identifiers based on the personality parameters. Still other possibilities exist, as will occur to those of skill in the art.

For example, consider the case where the identifiers extracted from the user phrase were found to be "[fetch] [ball]" and where the resulting simplified user intent is "[retrieve command] [object A] [object B]". This indicates that there should be only one object that should be retrieved by the virtual agent 200, yet both objects A and B are candidates for being retrieved. Consider now that the two objects A and B are associated with the semantic object tag "ball", but where object A is a crystal ball (and is associated with the semantic object tag "crystal ball") and where object B is soccer ball (and is associated with the semantic object tag "soccer ball"). (It is noted that it is not important whether either of these objects is real or virtual.)

In one embodiment, the virtual agent communication process, having determined that the number of semantic object tags is less than the number of object identifiers, may randomly choose to incorporate either object A or object B into the reaction of the virtual agent 200. For example, in order to handle the simplified user intent [eat] [cake] when there are multiple cakes in the field of view, the virtual agent communication process could choose one of the cakes for the virtual agent to eat, or the virtual agent communication process could operate on all the objects tagged as "cake". There may also be disambiguation in the simplified user intent itself (e.g., [eat] [cake] versus [eat] [all cakes]).

In another embodiment, the virtual agent communication process may consider the behavior type of the virtual agent 200 when selecting which object to incorporate into the reaction of the virtual agent 200. For instance, consider that the behavior type of the virtual agent is "sporty". Thus, with the virtual agent 200 having been instructed to retrieve a "ball", the virtual agent communication process may consult the various semantic object tags associated with each of objects A and B in the object database 320. The virtual agent communication process may carry out this step by assessing a "sportiness" factor of the semantic object tags associated with object A (the crystal ball) and those associated with object B (the soccer ball). This can be done according to a processing algorithm that searches for key words or phrases (such as individual sports, which are more likely to be associated with a soccer ball than with a crystal ball). As a result, the semantic object tags associated with object B are expected to generate a greater sportiness factor than the semantic tags associated with object A. This could lead to a selection of object B (the soccer ball) as the one to be incorporated into the reaction of the virtual agent 200.

The above example of disambiguation, which is not to be considered limiting, should assist those skilled in the art to understand how this notion may be applied to numerous other situations.

(c) Where the simplified user intent includes an object identifier of a particular game object, the reaction of the virtual agent 200 may depend on whether the particular game object is a real-world object or a virtual object. For example, the position of a virtual object can generally be changed arbitrarily in the virtual 3D space, whereas the position of a real-world object generally cannot. In another example, In a specific non-limiting example, consider a chair. If the chain is a virtual object, the game logic has accurate knowledge of the model and the freedom to manually place anchors for the agent interaction. The virtual agent can, for example, slide the chair out from behind a desk and sit down on it (since they both "live" in the 3D virtual world, both can be moved).

On the other hand, if the chair is a real-world object, it cannot be manipulated virtually. Thus, to make the virtual agent appear to sit on the chair, the virtual agent must be animated such that it appears to sit on the chair given the game logic's virtual understanding of this real-world chair (e.g. how big is it, what is its orientation, where is the surface where the virtual agent can rest).

Similarly, consider the specific non-limiting example of drinking from a real-world cup using a virtual straw. One needs to estimate where the top and middle of the cup is in order to position the virtual agent above it such that the (virtual) straw goes roughly into the cup at the right position. Then if occlusion of the cup is desired, this can be done by, e.g., manually writing bits to the depth buffer.

However, if the cup is a virtual cup, then the cup position, size, and orientation are known, and the game logic has the freedom to manually place anchors on the model for the interaction between cup and straw. The occlusion comes automatically due to conventional 3D rendering and occlusion via the depth buffer.

As such, the dimensionality of the real-world object is detected or estimated, and the virtual agent is conformed to the detected or estimated position/dimensionality of the real-world object, and this detected or estimated position/dimensionality of the real-world object is not modifiable. The virtual object then modifies its shape and/or position in response to the detected or estimated position/dimensionality of the real-world object, which is different from what might have occurred in the case of a virtual object, where the position/dimensionality of the virtual object could be changed in accordance with the desired reaction.

(d) Where the simplified user intent includes an object identifier associated with a particular game object (either a virtual object or a real-world object), the reaction of the virtual agent 200 to the simplified user intent may have a component that depends on a distance, in the 3D virtual space, between the virtual agent 200 and the particular game object.

(e) Where the simplified user intent includes an object identifier associated with a particular game object (either a virtual object or a real-world object), the reaction of the virtual agent 200 may have a component that is consistent with a property of the particular game object. For example, one property of the particular game object may be a temperature. The virtual agent communication process may be responsive to the temperature of the particular game object being above a threshold (and the virtual agent 200 being in proximity to the particular game object) to cause the reaction of the virtual agent 200 to simulate a reaction to being burnt, including animations such as a jolting of the body and a moving away from the particular game object.

(f) The reaction of the virtual agent 200 to the simplified user intent may have a component that depends on earlier instances of the simplified user intent. For example, if the simplified user intent is repeated based on newly received user input (e.g., 2, 3, 4 or more times), the virtual agent 200 may be animated so as to appear to express annoyance (e.g., through certain facial expressions or "body language"). Alternatively, the behavior type of the virtual agent 200 may be changed to "annoyed", which could have the same effect, namely the virtual agent 200 may be animated so as to appear to express annoyance.

The reaction of the virtual agent 200 may also include an audio phrase or utterance that is in accordance with the voice signature stored in the personality parameter database 310.

Where the simplified user intent was deemed "unknown" or "invalid", the virtual agent 200 may be animated so as to express confusion (e.g., a shrugging of the shoulders), which may not only be entertaining, but also clearly indicates to the user 3 that something went wrong with interpretation of the input that he or she had provided.

It should further be appreciated that one of the properties of the virtual agent 200 stored in the memory 4 may include a mode of operation, such as "normal" or "listening", for example. The above description may be applicable to "normal" mode of operation for the virtual agent 200. Consider now that the user 3 has started making a verbal utterance. As part of the virtual agent communication process, the at least one processor 2 may be configured to detect the beginning of the user phrase (which can be detected when the microphone receives significant input, e.g., above a certain threshold). In that case, the mode of operation for the virtual agent 200 may be changed to "listening". At this point, optional step 515 may be carried out (see FIG. 5), whereby the virtual agent communication process additionally animates the virtual agent 200 so as to exhibit the appearance of "listening". This occurs before the simplified user intent has been determined. For example, where the virtual agent 200 is illustrated as a creature having "ears", execution of step 515 could result in animating the ears of the virtual agent 200 so as to appear to "perk up" in order to represent a heightened state of attention. In the absence of the optional step 515, the virtual agent 200 may be animated on-screen in a default way (e.g., so as to appear disinterested or bored, for example). Once the complete user input has been received, the mode of operation of the virtual agent 200 may be switched back to "normal", which can have an "un-perking" effect on the ears of the creature.

Those skilled in the art will appreciate that the above described virtual agent communication process may satisfy the needs of users seeking to achieve word-based control of objects in an augmented reality setting. Although embodiments of the proposed solution may be more limited than sophisticated natural language processing in their ability to truly understand a given utterance, the result is a more cost-effective solution, both in terms of computational cost and in terms of real monetary cost (integration cost, outsourcing training, etc.).

Those skilled in the art will appreciate that when a processor is described as being "configured" to carry out an action or process, this can mean that the processor carries out the action or process by virtue of executing computer-readable instructions that are read from device memory where these computer-readable instructions are stored.

It should be appreciated that while a description of certain embodiments has been provided, further variants are within the scope of the invention, which is defined by the claims appended hereto.

What is claimed is:

1. A method implemented by a processor of a computing device, comprising:
    receiving an image from a camera;
    recognizing at least one real-world object in the image;
    displaying on a screen an augmented reality (AR) scene including the at least one real-world object and a virtual agent;
    receiving user input;
    deriving a simplified user intent from the user input; and
    in response to the user input, causing a reaction of the virtual agent within the AR scene, the reaction being dependent on the simplified user intent;
    wherein deriving a simplified user intent from the user input comprises:
        converting the user input into a user phrase;
        determining at least one semantic element in the user phrase, the at least one semantic element including at least one of an intent identifier and a semantic object tag; and
    converting the at least one semantic element into the simplified user intent by:
        obtaining (i) an intent associated with the intent identifier, the intent being obtained from an intent database storing a many-to-one mapping of intent identifiers to the intent; and (ii) a unique object identifier associated with the semantic object tag, the unique object identifier being obtained from an object database storing a many-to-one mapping of semantic object tags to the unique object identifier, wherein the unique object identifier is selected to correspond to an object that is in a field of view of the camera receiving the image; and
        concatenating the intent obtained from the intent database with the unique object identifier obtained from the object database to create the simplified user intent.

2. The method defined in claim 1, further comprising consulting the object database to obtain properties of the at least one real-world object, wherein the reaction is further dependent on the properties of the at least one real-world object.

3. The method defined in claim 1, wherein the user input includes a received utterance and wherein converting the user input into a user phrase includes applying speech-to-text processing to the received utterance to produce the user phrase comprising a set of words.

4. The method defined in claim 1, wherein the user input comprises text and wherein converting the user input into a user phrase includes carrying out at least one of spell checking, grammar checking and translation to produce the user phrase comprising a set of words.

5. The method defined in claim 1, wherein the at least one semantic element includes an intent identifier and a semantic object tag.

6. The method defined in claim 1, wherein determining at least one semantic element in the user phrase comprises consulting the intent database that stores intent identifiers in an attempt to recognize at least one of the intent identifiers as being present in the user phrase.

7. The method defined in claim 6, wherein determining at least one semantic element in the user phrase comprises consulting the object database that stores semantic object tags in an attempt to recognize at least one of the semantic object tags as being present in the user phrase.

8. The method defined in claim 7, wherein the intent database stores an association between the intent identifiers and corresponding intents and wherein the object database stores an association between the semantic object tags and corresponding unique object identifiers.

9. The method defined in claim 1, wherein the at least one semantic element includes a plurality of intent identifiers.

10. The method defined in claim 9, wherein the plurality of intent identifiers includes a command and a greeting.

11. The method defined in claim 10, further comprising prioritizing the command over the greeting when converting the user phrase into the simplified user intent.

12. The method defined in claim 1, wherein a plurality of unique object identifiers are associated with the semantic object tag, the unique object identifiers corresponding to different objects in the AR scene and wherein concatenating the intent with the unique object identifier to create the simplified user intent comprises concatenating the intent with the plurality of unique object identifiers to create the simplified user intent.

13. The method defined in claim 2, wherein the properties of the at least one real-world object comprise a shape of the real-world object, and wherein the reaction comprises moving the virtual agent and conforming a shape of the virtual agent to a shape of the real-world object during movement.

14. The method defined in claim 1, wherein recognizing the at least one real-world object in the image comprises applying machine vision processing to the image.

15. The method defined in claim 1, further comprising maintaining a 3D virtual world comprising the virtual agent and a virtual model of the real-world object.

16. The method defined in claim 1, wherein the reaction is further dependent on a specific behavior type of the virtual agent.

17. The method defined in claim 16, wherein the reaction comprises animation of the virtual agent further comprising accessing a database to obtain the specific behavior type of the virtual agent and applying a behavior tree to determine how to animate the virtual agent.

18. The method defined in claim 1, wherein the at least one semantic element comprises an intent identifier associated in a database with a command, wherein the reaction comprises animating the virtual agent so as to exhibit an apparent movement that evokes carrying out the command.

19. The method defined in claim 18, wherein the reaction further comprises preceding the apparent movement with an animation of the virtual agent so as to exhibit a perceived acknowledgement of the command.

20. The method defined in claim 1, wherein the reaction includes a component that depends on a distance, in a 3D virtual space, between the virtual agent and the object associated with the unique object identifier.

21. The method defined in claim 1, wherein the reaction includes a component that depends on a distance, in a 3D virtual space, between the virtual agent and a property of the object associated with the unique object identifier.

22. The method defined in claim 1, wherein the reaction includes a component that depends on at least one previous instance of the simplified user intent.

23. A non-transitory computer-readable storage medium comprising computer-readable instructions which, when read and executed by at least one processor of a gaming device, cause the gaming device to carry out a method in a video game that comprises:
  receiving an image from a camera;
  using a machine vision process to recognize at least one real-world object in the image;
  displaying on a screen an augmented reality (AR) scene including the at least one real-world object and a virtual agent;
  receiving user input;
  deriving a simplified user intent from the user input; and
  in response to the user input, animating the virtual agent within the AR scene, the animating being dependent on the simplified user intent;
  wherein deriving a simplified user intent from the user input comprises:
    converting the user input into a user phrase;
    determining at least one semantic element in the user phrase, the at least one semantic element including at least one of an intent identifier and a semantic object tag; and
    converting the at least one semantic element into the simplified user intent by:
      obtaining (i) an intent associated with the intent identifier, the intent being obtained from an intent database storing a many-to-one mapping of intent identifiers to the intent; and (ii) a unique object identifier associated with the semantic object tag, the object identifier being obtained from an object database storing a many-to-one mapping of semantic object tags to the unique object identifier, wherein the unique object identifier is selected to correspond to an object that is in a field of view of the camera receiving the image; and
      concatenating the intent obtained from the intent database with the unique object identifier obtained from the object database to create the simplified user intent.

24. A non-transitory computer-readable storage medium comprising computer-readable instructions which, when read and executed by at least one processor of a gaming device, cause the gaming device to carry out the method comprising:
  receiving an image from a camera;
  recognizing at least one real-world object in the image;
  displaying on a screen an augmented reality (AR) scene including the at least one real-world object and a virtual agent;
  receiving user input;
  deriving a simplified user intent from the user input; and
  in response to the user input, causing a reaction of the virtual agent within the AR scene, the reaction being dependent on the simplified user intent;
  wherein deriving a simplified user intent from the user input comprises:
    converting the user input into a user phrase;
    determining at least one semantic element in the user phrase, the at least one semantic element including at least one of an intent identifier and a semantic object tag; and
    converting the at least one semantic element into the simplified user intent by:
      obtaining (i) an intent associated with the intent identifier, the intent being obtained from an intent database storing a many-to-one mapping of intent identifiers to the intent; and (ii) a unique object identifier associated with the semantic object tag, the unique object identifier being obtained from an object database storing a many-to-one mapping of semantic object tags to the unique object identifier, wherein the unique object identifier is selected to correspond to an object that is in a field of view of the camera receiving the image; and
      concatenating the intent obtained from the intent database with the unique object identifier obtained from the object database to create the simplified user intent.

25. A gaming device comprising at least one processor and a memory storing instructions for execution by the processor, at least one input device configured to receive input from a user, at least one output device configured for providing output to the user, the at least one processor configured to execute the instructions in the memory for implementing an interactive computer program that generates the output in response to the received input and, the interactive computer program including at least one process that comprises:
  receiving an image from a camera;
  using a machine vision process to recognize at least one real-world object in the image;
    displaying on a screen an augmented reality (AR) scene including the at least one real-world object and a virtual agent;
  receiving user input;
  deriving a simplified user intent from the user input; and
  in response to the user input, animating the virtual agent within the AR scene, the animating being dependent on the simplified user intent;
  wherein deriving a simplified user intent from the user input comprises:
    converting the user input into a user phrase;
    determining at least one semantic element in the user phrase, the at least one semantic element including at least one of an intent identifier and a semantic object tag; and
    converting the at least one semantic element into the simplified user intent by:
      obtaining (i) an intent associated with the intent identifier, the intent being obtained from an intent database storing a many-to-one mapping of intent identifiers to the intent; and (ii) a unique object identifier associated with the semantic object tag, the unique object identifier being obtained from an object database storing a many-to-one mapping of semantic object tags to the unique object identifier, wherein the unique object identifier is selected to correspond to an object that is in a field of view of the camera receiving the image; and
      concatenating the intent obtained from the intent database with the unique object identifier obtained from the object database to create the simplified user intent.

26. A gaming device comprising at least one processor and a memory storing instructions for execution by the processor, at least one input device configured to receive input from a user, at least one output device configured for providing output to the user, the at least one processor configured to execute the instructions in the memory for implementing an interactive computer program that generates the output in response to the received input and, the interactive computer program implementing the method comprising:
  receiving an image from a camera;
  recognizing at least one real-world object in the image;

displaying on a screen an augmented reality (AR) scene including the at least one real-world object and a virtual agent;
receiving user input;
deriving a simplified user intent from the user input; and
in response to the user input, causing a reaction of the virtual agent within the AR scene, the reaction being dependent on the simplified user intent;
wherein deriving a simplified user intent from the user input comprises:
  converting the user input into a user phrase;
  determining at least one semantic element in the user phrase, the at least one semantic element including at least one of an intent identifier and a semantic object tag; and
  converting the at least one semantic element into the simplified user intent by:
    obtaining (i) an intent associated with the intent identifier, the intent being obtained from an intent database storing a many-to-one mapping of intent identifiers to the intent; and (ii) a unique object identifier associated with the semantic object tag, the unique object identifier being obtained from an object database storing a many-to-one mapping of semantic object tags to the unique object identifier, wherein the unique object identifier is selected to correspond to an object that is in a field of view of the camera receiving the image; and
    concatenating the intent obtained from the intent database with the unique object identifier obtained from the object database to create the simplified user intent.

\* \* \* \* \*